United States Patent
Merchant et al.

(10) Patent No.: US 7,612,566 B2
(45) Date of Patent: Nov. 3, 2009

(54) METHOD AND APPARATUS FOR THE USE OF MULTICOMPONENT INDUCTION TOOL FOR GEOSTEERING AND FORMATION RESISTIVITY DATA INTERPRETATION IN HORIZONTAL WELLS

(75) Inventors: Gulamabbas A. Merchant, Houston, TX (US); Otto N. Fanini, Houston, TX (US); Berthold Kriegshauser, Rio de Janeiro (BR); Liming Yu, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/758,390

(22) Filed: Jun. 5, 2007

(65) Prior Publication Data
US 2007/0236221 A1 Oct. 11, 2007

Related U.S. Application Data

(62) Division of application No. 10/373,365, filed on Feb. 24, 2003, now Pat. No. 7,463,035.

(51) Int. Cl.
*G01V 3/18* (2006.01)
(52) U.S. Cl. ........................ 324/339; 324/323
(58) Field of Classification Search ............... 324/323, 324/339–343
See application file for complete search history.

(56) References Cited

U.S. PATENT DOCUMENTS

| | | | |
|---|---|---|---|
| 4,837,517 A | 6/1989 | Barber | 324/339 |
| 5,038,107 A | 8/1991 | Gianzero et al. | |
| 5,157,605 A | 10/1992 | Chandler et al. | 364/422 |
| 5,168,234 A | 12/1992 | Freedman | |
| 5,339,036 A | 8/1994 | Clark et al. | |
| 5,446,654 A | 8/1995 | Chemali et al. | 364/422 |
| 5,452,761 A | 9/1995 | Beard et al. | 166/250 |
| 5,453,693 A | 9/1995 | Sinclair et al. | |
| 5,530,358 A | 6/1996 | Wisler et al. | |
| RE35,386 E | 12/1996 | Wu et al. | 175/45 |
| 5,774,360 A | 6/1998 | Xiao et al. | 702/6 |
| 5,781,436 A | 7/1998 | Forgang et al. | |
| 5,867,806 A | 2/1999 | Strickland et al. | 702/7 |
| 5,886,526 A | 3/1999 | Wu | |
| 5,892,361 A | 4/1999 | Meyer, Jr. et al. | |
| 5,939,885 A | 8/1999 | McClure et al. | |
| 5,999,883 A | 12/1999 | Gupta et al. | 702/7 |
| 6,049,209 A | 4/2000 | Xiao et al. | 324/339 |
| 6,084,052 A | 7/2000 | Aufdermarsh et al. | |
| 6,105,690 A | 8/2000 | Binglin, Jr. et al. | |
| 6,147,496 A | 11/2000 | Strack et al. | 324/343 |

(Continued)

FOREIGN PATENT DOCUMENTS

EP 0466454 A2 1/1992

(Continued)

*Primary Examiner*—Reena Aurora
(74) *Attorney, Agent, or Firm*—Madan & Sriram, P.C.

(57) ABSTRACT

Measurements made with a multicomponent logging instrument when used in a substantially horizontal borehole in earth formations provide diagnostic of the direction of beds relative to the position of the borehole. When the logging instrument is conveyed on a drilling assembly, the drilling trajectory may be maintained to follow a predetermined trajectory or to maintain a desired distance from a boundary such as an oil-water contact.

10 Claims, 11 Drawing Sheets

U.S. PATENT DOCUMENTS

| | | | |
|---|---|---|---|
| 6,466,872 B1 * | 10/2002 | Kriegshauser et al. | 702/7 |
| 6,502,036 B2 * | 12/2002 | Zhang et al. | 702/7 |
| 6,591,194 B1 * | 7/2003 | Yu et al. | 702/7 |
| 6,925,384 B2 * | 8/2005 | Frenkel et al. | 702/7 |
| 7,265,552 B2 * | 9/2007 | Bittar | 324/337 |

FOREIGN PATENT DOCUMENTS

| | | |
|---|---|---|
| FR | 2801985 | 6/2001 |
| GB | 2287324 A | 9/1995 |

\* cited by examiner

METHOD AND APPARATUS FOR THE USE OF MULTICOMPONENT INDUCTION TOOL FOR GEOSTEERING AND FORMATION RESISTIVITY DATA INTERPRETATION IN HORIZONTAL WELLS

CROSS REFERENCES TO RELATED APPLICATIONS

This application is a divisional application of U.S. patent application Ser. No. 10/373,365, filed on Feb. 24, 2003, which is a continuation-in-part of U.S. patent application Ser. No. 10/214,436, now U.S. Pat. No. 6,900,640, filed on 7 Aug. 2002, and which also claims priority from U.S. Provisional Patent Application Ser. No. 60/361,570 filed on 4 Mar. 2002.

BACKGROUND OF THE INVENTION

1. Field of the Invention

The invention is related generally to the field of electrical resistivity well logging methods. More specifically, the invention is related to methods for using multi-array induction and multi-component induction measurements for geosteering, reservoir navigation and open hole applications involving formations that may be anisotropic for geosteering and open hole applications involving anisotropic formations.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p. 148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al.; and U.S. Pat. No. 5,452,761 issued to Beard et al.

A typical electrical resistivity-measuring instrument is an electromagnetic induction military well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages form curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the boundary than the shorter-spaced receiver coils do. As a result, the logs of longer-spaced receiver coils have longer shoulder-bed effects than the logs of shorter-spaced receiver coils. The logs of all the receiver coils form a certain pattern.

If the layers are not perpendicular to the axis of the instrument, the conductivity of the media surrounding the instrument can vary azimuthally, causing the inferences about the conductivity from the measurements of the induction voltage to be in error. A method for correcting the error is described in U.S. Pat. No. 5,774,360 issued to Xiao and Zhou. The method requires the relative dip angle as a priori information. The relative dip angle is the angle between the borehole axis and the normal of the bedding plane. Because the formation layers can also be inclined, the relative dip angle is normally unknown even though the wellbore deviation is known. U.S. Pat. No. 6,049,209 issued to Xiao and Geldmacher teaches another method has also been developed to interpret induction logs in the environments of relative inclination and anisotropy. The method requires the relative dip angle and the anisotropy coefficient as a priori information. The anisotropy coefficient can be defined as the ratio between the resistivity perpendicular to bedding and the resistivity parallel to bedding.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however are those layers which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al., (the "Gupta patent"), the contents of which are fully incorporated here by reference, discloses a method for determining the horizontal and vertical conductivity of anisotropic earth formations. Measurements are made of electromagnetic induction signals induced by induction transmitters oriented along three mutually orthogonal axes. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to the direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

Shoulder bed corrections related to the effect of formations above and below the depth being evaluated also have to be applied to the data. Methods for making these corrections to data acquired with conventional logging tools are well known in the art.

For example, U.S. Pat. No. 5,446,654 to Chemali teaches the conversion of a resistivity log as a function of well depth into a rectangularized curve so that the interfaces of the adjacent strata are located, and a suitable number of iterations, a correction factor is applied. The corrected rectangular log is obtained with a correction coefficient computed at each depth. For each computation, the impact of all the strata within a specified depth window is considered, while strata beyond that window are simplified by representing the strata beyond the window with single equivalent bed values to reduce the number of computations required. This then provides a resistivity log which is substantially free of shoulder bed effect.

The method of U.S. Pat. No. 5,867,806 to Strickland et al. corrects for shoulder bed effect in LWD resistivity logs through inversion. The method selects one or more control depths at one or more locations of each of a plurality of detected beds in the formation. The method then estimates the resistivity of each bed only at the selected control depths to produce an estimated resistivity of the beds. The method then computes a simulated log value at each control depth using a current estimate of the resistivity of the beds. The computer-simulated log is then computed to the actual log data at each control depth, and the resistivity of each bed is adjusted using the difference between the actual and simulated values at the control depths. The method iteratively repeats a plurality of times until the simulated log substantially matches the actual log at the control depths.

Electrically anisotropic reservoirs are encountered frequently in hydrocarbon exploration. For accurate saturation estimation and optimum hydrocarbon recovery from these reservoirs, it is essential to detect and properly describe their electrical properties. For example, in laminated sand-shale sequences or sands with different grain size distributions, the vertical resistivity (perpendicular to the bedding) is more indicative of the hydrocarbon content than the horizontal resistivity (parallel to the bedding). However, the response measured by conventional induction tools with their transmitter-receiver coil moments oriented normal to bedding is dominated by the horizontal resistivity. Therefore, a petrophysical evaluation based on these data can either overlook hydrocarbons present in laminated sands or underestimate their productivity.

The relative formation dip angle is vital for proper and accurate interpretation of data acquired by the new multicomponent induction instrument. This newly developed induction instrument comprises three mutually orthogonal transmitter-receiver arrays. These configurations allow us to determine both horizontal and vertical resistivities for an anisotropic formation in vertical, deviated, and horizontal boreholes. A description of an early version of the tool can be found in U.S. Pat. No. 6,147,496 to Beard et al, the contents of which are incorporated herein by reference. The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver. The z-direction is parallel to the borehole. In addition, the instrument measures all other cross-components of the magnetic fields, i.e., $H_{xy}$, $H_{xz}$, $H_{yx}$, $H_{yz}$, $H_{zx}$, and $H_{zy}$.

The signals acquired by the main receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a least-square sense the data match of the synthetic tool responses with measured data. Required inputs in this process are accurate information of the relative formation dip and relative formation azimuth. This information can be derived using in addition to the main signals ($H_{xx}$, $H_{yy}$, and $H_{zz}$) the data from the cross-components.

Conventional induction tools comprising only coaxial transmitter-receiver coil configurations do not have azimuthal sensitivity. Therefore, in a horizontal wellbore, the data do not contain information about directionality of the formation. It is not possible to distinguish whether a layer is above or below the borehole from these data alone. There is a need to be able to determine directionality of the formation. This knowledge can be obtained using a subset or all of the cross-components of the new multi-component induction tool allows determination of directionality of the formation.

Another use of multicomponent resistivity tools is in navigation in anisotropic reservoirs. An example of the use of resistivity is given in U.S. Pat. RE 35386 to Wu et al, having the same assignee as the present application and the contents of which are fully incorporated herein by reference. Disclosed in Wu is a method for detecting and sensing boundaries between strata in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real-time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity measurements made in Wu are made with a conventional electromagnetic (EM) propagation resistivity instrument. The measurements made with a propagation EM tool lack directional information.

It would be desirable to have a method of logging in anisotropic formations that can determine borehole deviation relative to the bedding. Such a method should preferably be have directionality information and be suitable for use in reservoir navigation. The present invention satisfies this need.

SUMMARY OF THE INVENTION

The present invention is a method of determining a parameter of interest of an earth formation having a plurality of layers. A logging tool is conveyed into a borehole in a selected layer in the earth formation, the borehole having an axial direction inclined at a angle to a normal to said layers. At a selected frequency, a plurality of multi-component and/or array resistivity measurements indicative of the parameter of interest are obtained. Using an obtained resistivity value for each of the plurality of layers; the multicomponent resistivity measurements are processed to obtain the parameter of interest. In a preferred embodiment of the invention, the parameter of interest is a distance to a boundary between a pair of layers. The logging tool may be conveyed into the borehole on either a wireline or on a drillstring. The obtained resistivity values may come from a previously drilled borehole.

In a preferred embodiment of the invention, principal component measurements are made in which the coil axes are aligned either parallel to or orthogonal to the tool axis. In alternate embodiments of the invention, measurements made with coils inclined at other angles to the tool axis may be used; or measurements made through a slotted antenna cover are made. In either case, a sufficient number of independent measurements need to be made to be able to define principal components.

An earth model is defined from the previously obtained resistivity. Using the earth model and the tool response, expected multicomponent measurement values are predicted along a planned well trajectory. Differences between the actual measurements and the model outputs may be used to alter the drilling direction. In one embodiment of the invention, a distance to a bed boundary is determined using a distance indicator. The distance indicator is based upon combinations of multicomponent measurements. This distance indicator may be used in reservoir navigation for maintaining the borehole at a desired distance from a fluid interface such as an oil-water contact.

BRIEF DESCRIPTION OF THE DRAWINGS

The invention is best understood by reference to the following figures wherein like numbers refer to like components

DESCRIPTION OF PREFERRED EMBODIMENT

Figures 1, 2:
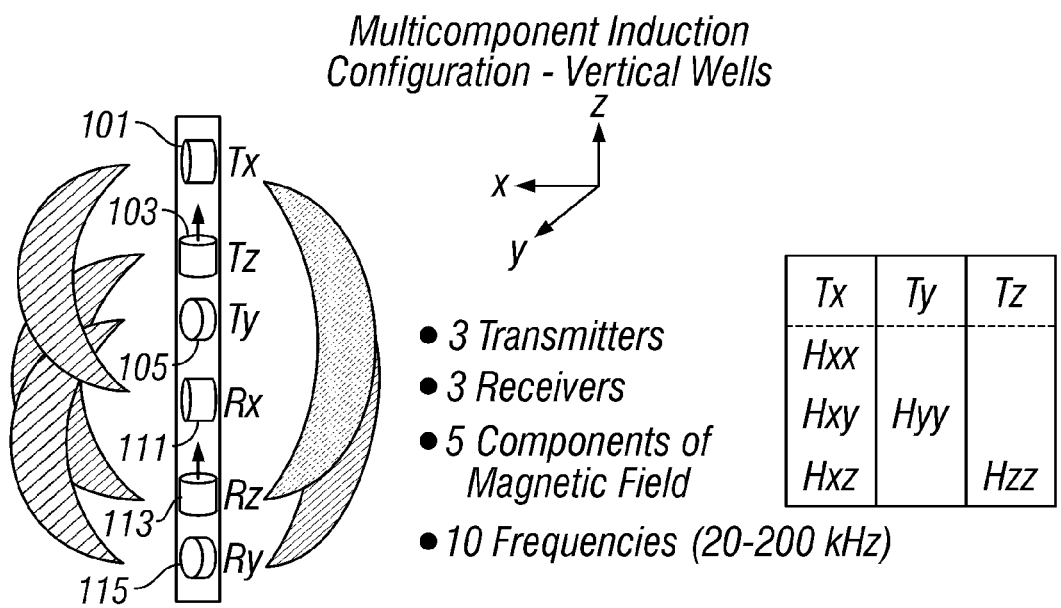
FIG. 1 depicts a sketch of the new 3DEX multi-component induction tool.
FIG. 2 shows an example of two simulated cases of horizontal formations.

FIG. 1 shows the configuration of transmitter and receiver coils in a preferred embodiment of the 3DExplorer™ (3DEX) induction logging instrument of Baker Hughes. The basic concepts of the logging instrument have been described in the Gupta patent referenced above. Three orthogonal transmitters 101, 103, and 105 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the axis. Corresponding to each transmitter 101, 103, and 105 are associated receivers 111, 113, and 115, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$, of the magnetic field produced by the $T_x$ transmitter (101). This embodiment of the invention is operable in single frequency or multiple frequency modes. It should further be noted that the description herein with the orthogonal coils and one of the axes parallel to the tool axis is for illustrative purposes only. Additional components could be measured, and, in particular, the coils could be inclined at an angle other than 0° or 90° to the tool axis, and furthermore, need not be orthogonal; as long as the measurements can be "rotated" or "projected" onto three orthogonal axes, the methodology described herein is applicable. Measurements may also be made at a plurality of frequencies, and/or at a plurality of transmitter-receiver distances.

As an example of the sensitivity to directionality of the 3DEX tool, a bed layer configuration illustrated in FIG. 2 and response value are tabulated in Table 1.

TABLE 1

| Magnetic field response (A/m) | Case1 | Case2 |
|---|---|---|
| Hxx | 8.86777008E−04 | 8.86777008E−04 |
| Hxy | −1.99889226E−04 | −1.99889226E−04 |
| Hxz | 2.45139177E−04 | −2.45139207E−04 |
| Hyy | 1.11758942E−03 | 1.11758942E−03 |
| Hyx | 1.99889240E−04 | 1.99889240E−04 |
| Hyz | −1.41531185E−04 | 1.41531200E−04 |
| Hzz | 1.16889027E−03 | 1.16889027E−03 |

Figure 15:
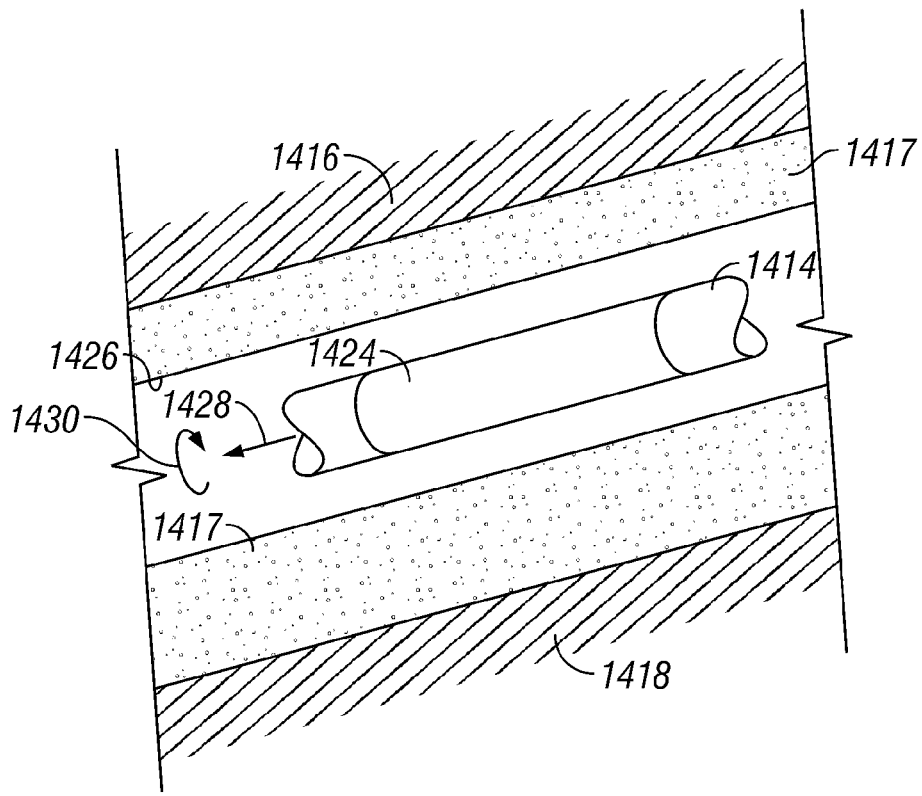
FIG. 15 shows a configuration for a deviated well in an earth formation.

The configuration in FIG. 2 is comprised of two cases of three-layered media, labeled Case 1 and Case 2. In both cases, the middle layers 213 and 223 are 1 m thick and have a horizontal resistivity ($R_h$) of 4 Ω-m and a vertical resistivity ($R_v$) of 10 Ω-m. In Case 1, the $R_h$ and $R_v$ are both 1 Ω-m in the top layer 211 and 2 Ω-m in the bottom layer 15. In Case 2, the resistivities are interchanged from Case 1, with a $R_h$ and $R_v$ both equal to 2 Ω-m in the top layer 221 and 1 Ω-m in the bottom layer 225. In both cases, the relative dip of the borehole is 90 degrees (horizontal borehole) and azimuth angle is 30 degrees. The configuration is shown in FIG. 15, with $T_z$, pointing out of the page, $T_x$(1501) aligned with its normal at an angle of 30° to the vertical, and $T_y$(1502) aligned with its normal at an angle of 60° to the vertical.

Table 1 shows the magnetic fields responses for the 3DEX instrument taken while positioned in the middle of the center layer. The responses are normalized to a unit transmitter-receiver moment and are for an excitation frequency of 20 kHz. The normalized field responses are in units A/m. These simple results demonstrate that although $H_{xx}$, $H_{yy}$, and $H_{zz}$, are insensitive to directionality, the $H_{xy}$ and $H_{xz}$ components (shown in bold in Table 1) are sensitive to directionality in a horizontal wellbore. With this knowledge, a practitioner of the art can discriminate whether a layer is above or below the borehole trajectory and thus can use said knowledge for geosteering purposes.

Figure 3:
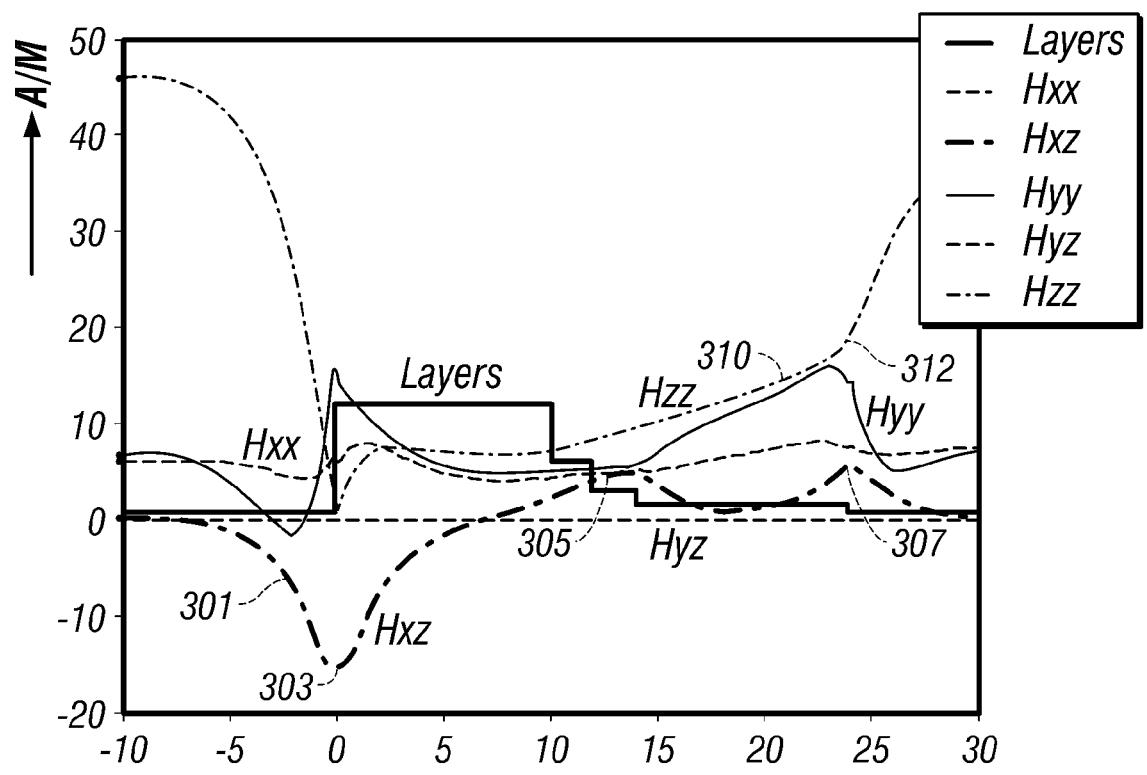
FIG. 3 shows a graph of a typical six-level anisotropic turbidite sequence along with responses of the five components to the applied RF magnetic field at 20 kHz.

FIG. 3 shows a case (Case 3) of a typical anisotropic turbidite layer sequence. The lithology sequence from top to bottom of the model is shale, thick sand, followed by a transition to a low resistivity and electrically anisotropic sand-shale sequence. The resistivities of this bed layer structure are tabulated in Table 2.

TABLE 2

| Resistivity Bed | Depth top boundary (ft) | Rh (Ω-m) | Rv (Ω-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 5 |
| 6 | 24 | 0.8 | 0.8 |

It is to be noted that FIGS. 3-9 do not show tool responses as a tool is moved along a wellbore: in each of the figures, the borehole is horizontal. What is shown is the response of the tool in a fixed position within a horizontal (or highly deviated) borehole placed at a varying distance with respect to the top resistivity layer interface described by the curve "Layerer" The sequence contains six overall bed layers, the resistivity of all layers being isotropic except for the fifth bed layer. The anisotropic fifth layer (between 15 and 25 feet of depth) has $R_h$=1.5 Ω-m and $R_v$=5 Ω-m The tool operates at multiple frequencies. Only the 20 kHz response is shown here. In thick beds, when the boundaries are more than 5 feet away from the tool, the $H_{xz}$ response is zero (301). The $H_{xz}$ response starts showing sensitivity to a bed boundary when that bed boundary is within 5 feet of the tool. If the tool is moving from a region of low resistivity to a region of high resistivity, $H_{zz}$ has a negative response (303). Similarly, when the tool is moving from a on of high resistivity to a region of low resistivity, the $H_{xz}$ response is positive (305 and 307). $H_{zz}$ experiences a positive deflection in the isotropic (fifth) bed layer (310), but experiences a larger deflection as the tool enters the isotropic sixth bed layer (312).

Figure 4:
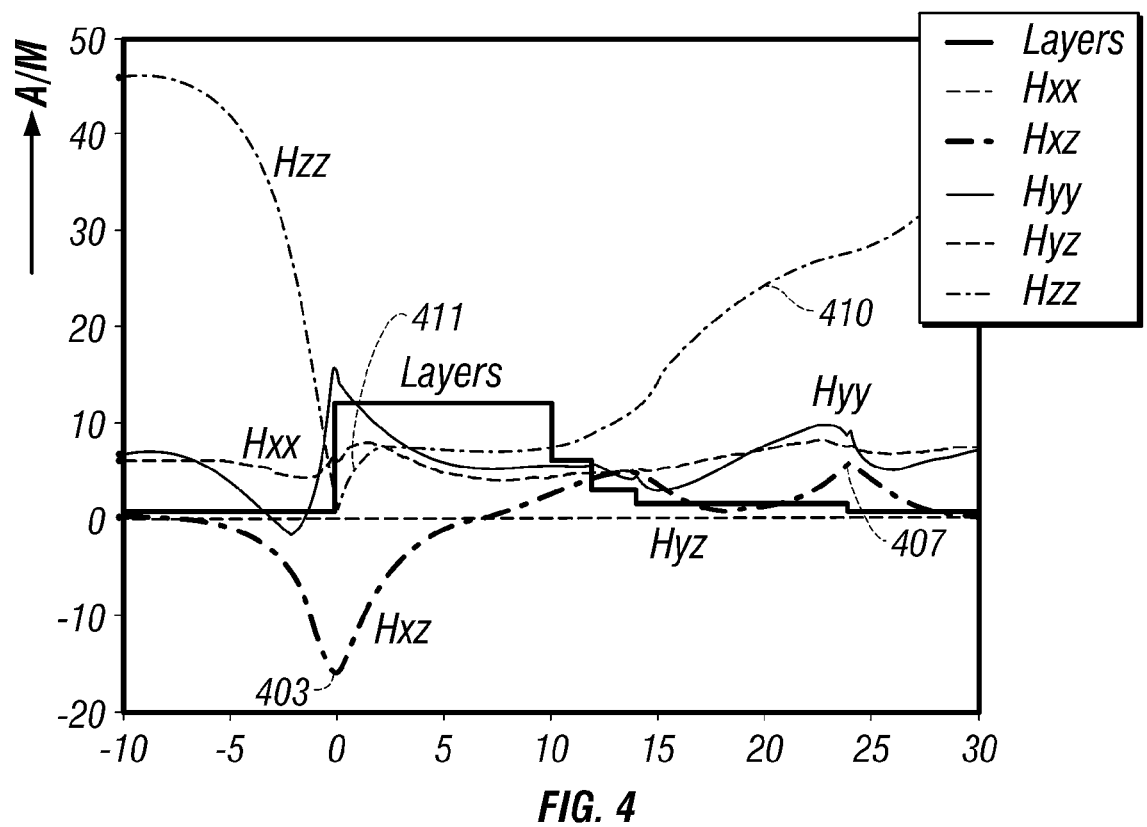
FIG. 4 shows a graph of a six-level isotropic sequence along with responses of the five components to the applied RF magnetic field at 20 kHz.

A comparison can be made between Case 3 in FIG. 3 and Case 4 in FIG. 4. FIG. 4 shows a bed layer structure having a resistivity that is completely isotropic at all bed layers, including an isotropic fifth bed layer. The resistivities of this bed layer structure are tabulated in Table 3. Compare the values in bold face with the corresponding values Table 2.

TABLE 3

| Resistivity Bed | Depth top boundary (ft) | Rh (Ω-m) | Rv (Ω-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 1.5 |
| 6 | 24 | 0.8 | 0.8 |

In Case 4, $R_v$, and $R_h$ are both equal to 1.5 Ω-m at the fifth bed layer. The $H_{xz}$ component in FIG. 4 is not different substantially from the $H_{xz}$ response in FIG. 3, even along transitions into and out of the isotropic fifth bed. There is however a noticeable influence on $H_{zz}$ component as the tool crosses the boundary between the fourth and fifth bed layers. Comparing (310) in FIG. 3 with (410) in FIG. 4, shows the dampening effect anisotropy had on the $H_{zz}$ component.

Figure 5:
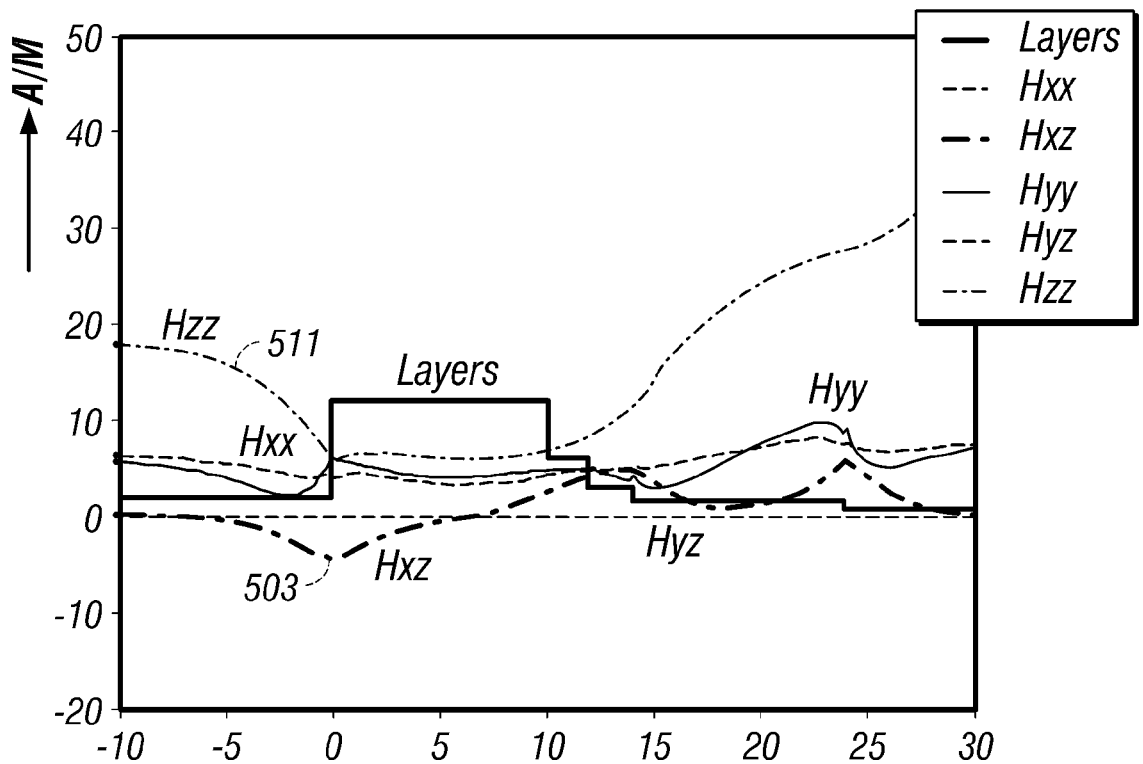
FIG. 5 shows a graph of the sequence of FIG. 4 with altered resistivities at the first bed layer along with responses of the five components to the applied RF magnetic field at 20 kHz.

FIG. 5 shows a bed layer sequence with a single variation on Case 4 of FIG. 4. The horizontal and vertical resistivities at the first depth are equal to 2 Ω-m in FIG. 5 whereas the corresponding resistivities are 0.6 Ω-m in FIG. 4. The resistivities of this bed layer structure are tabulated in Table 4.

TABLE 4

| Resistivity Bed | Depth top boundary (ft) | Rh (Ω-m) | Rv (Ω-m) |
|---|---|---|---|
| 1 | −10 | 2 | 2 |
| 2 | 0 | 12 | 12 |
| 3 | 10 | 6 | 6 |
| 4 | 12 | 3 | 3 |
| 5 | 14 | 1.5 | 1.5 |
| •6 | 24 | 0.8 | 0.8 |

In the new formation of FIG. 5, corresponding to the reduced differences in the resistivities of the first and second bed layers, there is less deflection of the $H_{xz}$ component crossing from the first bed to the second bed (503) compared to (403) in FIG. 4. The magnitude of the negative deflection of $H_{zz}$ (511) is also reduced from it's the deflection (411) in FIG. 4.

Figure 6:
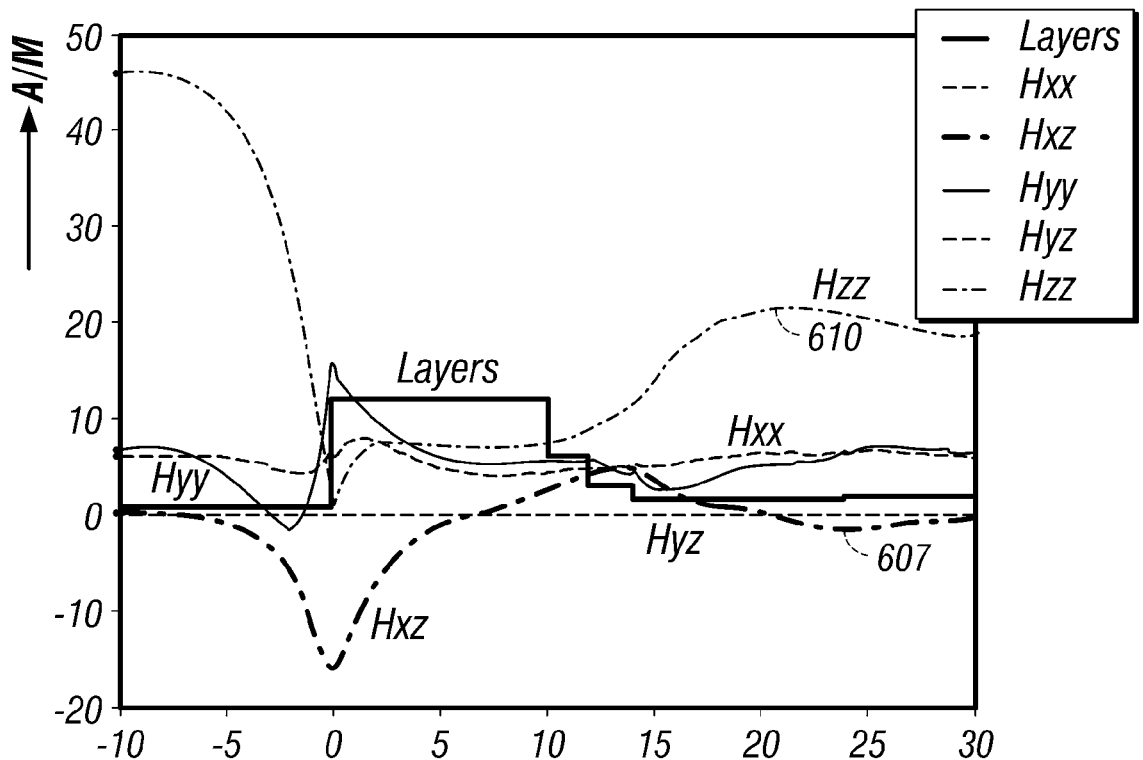
FIG. 6 shows a graph of the sequence of FIG. 4 with altered resistivities at the sixth bed layer along with responses of the five components to the applied RF magnetic field at 20 kHz.

The bed layer structure in FIG. 6 shows another single variation on the sequence of FIG. 4. In FIG. 6, the sixth depth level has $R_h$ and $R_v$ equal to 2 Ω-m where the resistivity is 0.8 Ω-m in FIG. 4. The resistivities of this bed layer structure are tabulated in Table 5.

TABLE 5

| Resistivity Bed | Depth top boundary (ft) | Rh (Ω-m) | Rv (Ω-m) |
| --- | --- | --- | --- |
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 1.5 |
| •6 | 24 | 2 | 2 |

Whereas in FIG. 4 the fifth bed layer is more resistive than the sixth bed layer, in FIG. 6 the sixth bed layer is more resistive in all directions than the fifth bed layer. As a result, the deflection of $H_{xz}$ (607) is opposite the direction of the deflection in FIG. 4 (407) across this boundary. As the tool moves from fifth level to the sixth level, the response of the $H_{zz}$ component (610) also reverses its deflected direction from FIG. 4 (410).

Figure 7:
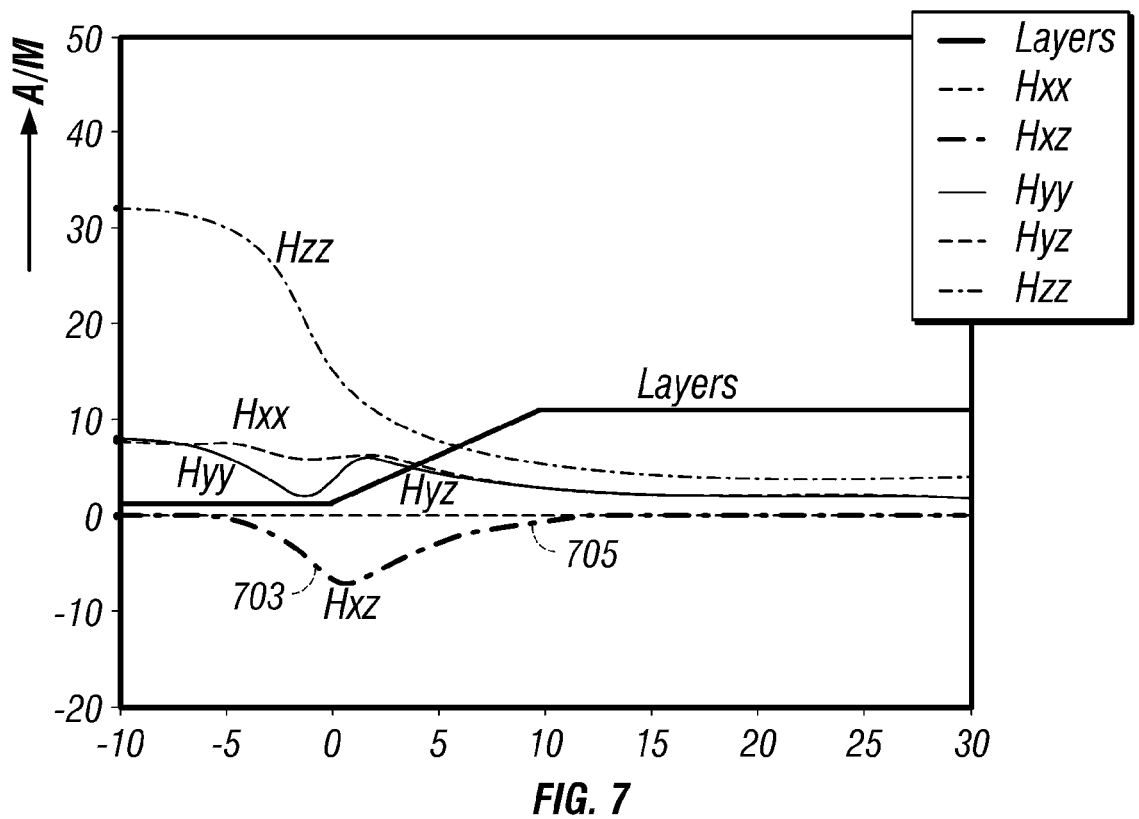
FIG. 7 shows a graph of a three-level linearly graded transition sequence along with responses of the five components to the applied RF magnetic field at 20 kHz.

FIG. 7 shows a linearly graded transition region which lies between 0 and 10 feet between a comparatively low resistivity bed (1 Ω-m) and a comparatively high resistivity bed (11 Ω-m). The resistivities of this bed layer structure are tabulated in Table 6.

TABLE 6

| Resistivity Bed | Depth top boundary (ft) | Rh (Ω-m) | Rv (Ω-m) |
| --- | --- | --- | --- |
| 1 | −10 | 1 | 1 |
| 2 | 0 | Linear grading | Linear grading |
| 3 | 10 | 11 | 11 |

At all levels, the resistivity is isotropic. The deflection of $H_{xz}$ depends on the conductivity profile. In the beginning of the transition zone, the deflection of $H_{xz}$ (703) is large because the slope of the conductivity profile (reciprocal of resistivity) is large. At the end of the zone, the conductivity slope is smaller, and therefore $H_{xz}$ (705) does not detect the transition into the third bed. Again, the deflection in the entire region is negative because resistivity is increasing.

Figure 8:
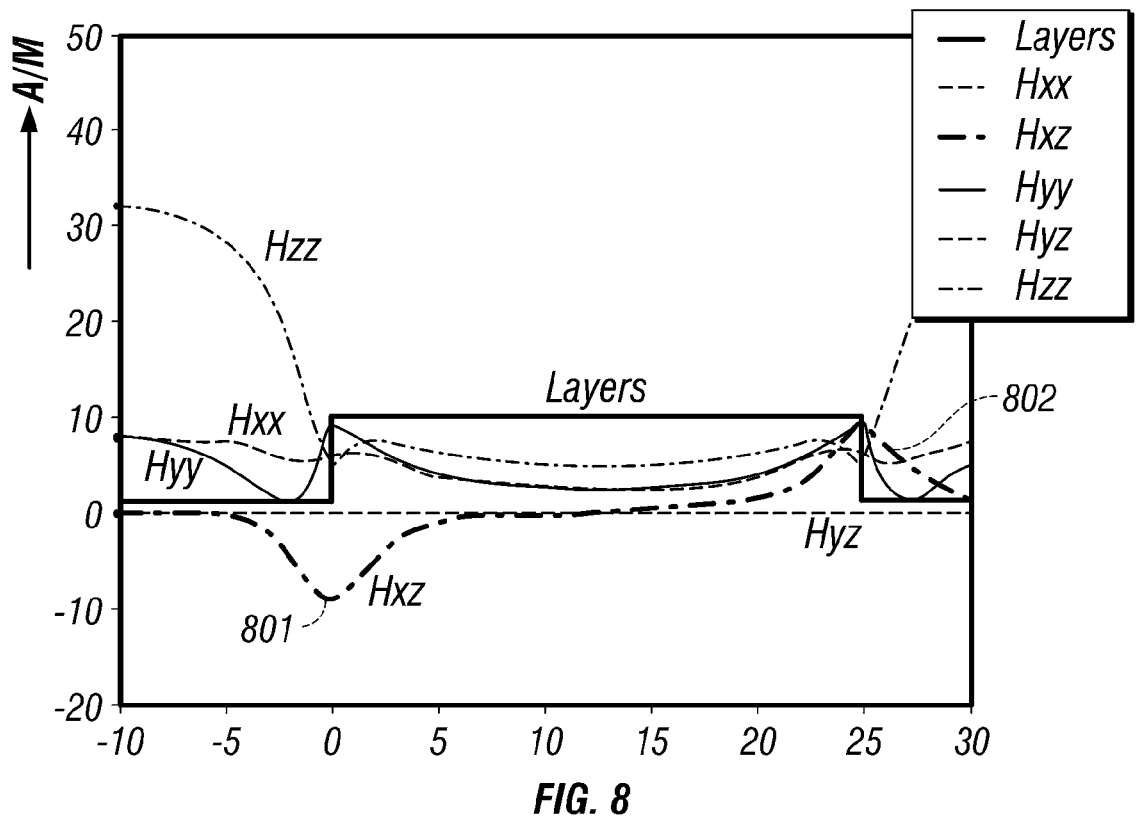
FIG. 8 shows a graph of a thick resistive bed sandwiched between two conductive beds along with responses of the five components of the applied RF magnetic field at 20 kHz.

FIG. 8 shows a case of a thick resistive bed sandwiched between two conductive beds. The sequence corresponds to a top level of shale, a middle thick resistive sand level, and a bottom level of shale. The resistivities of this bed layer structure are tabulated in Table 7.

TABLE 7

| Resistivity Bed | Depth top boundary (ft) | Rh (Ω-m) | Rv (Ω-m) |
| --- | --- | --- | --- |
| 1 | −10 | 1 | 1 |
| 2 | 0 | 10 | 10 |
| 3 | 10 | 1 | 1 | deflection of $H_{xz}$ (801) is negative at the boundary at a depth of 0 feet and has the same order of magnitude as the corresponding deflection in FIG. 3. Similarly, at the boundary between the beds at 25 feet, the deflection of $H_{xz}$(803) is positive as the tool crosses into the layer of lower resistivity. $H_{zz}$ responses are also consistent with the results of FIG. 4.

Figure 9:
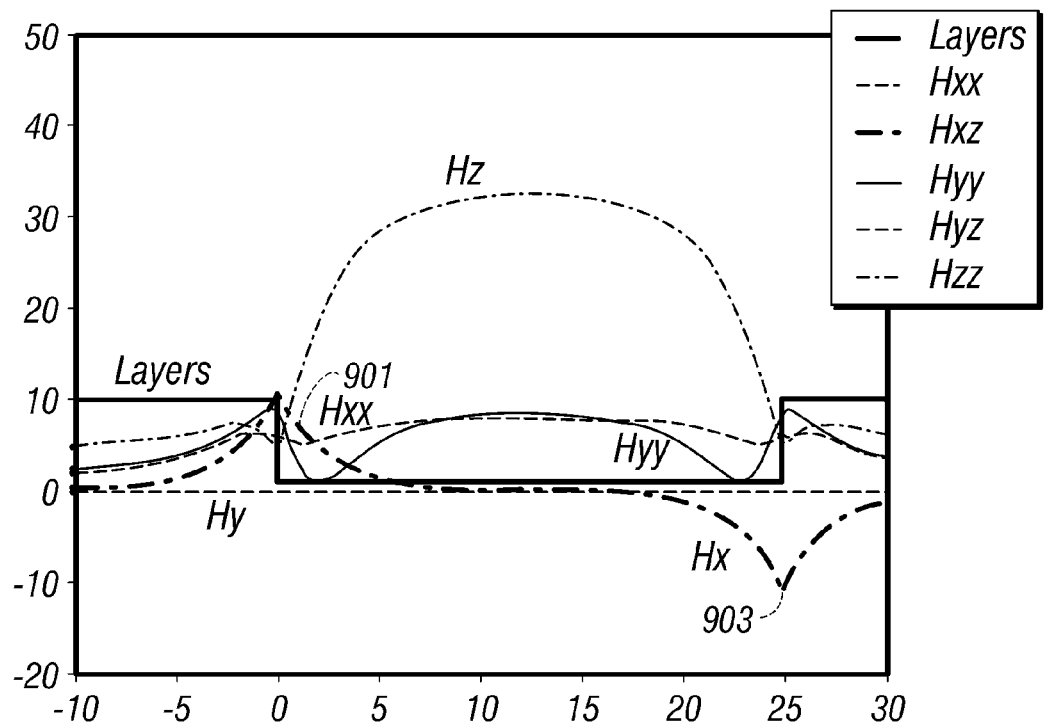
FIG. 9 shows a graph of a thick conductive bed sandwich between two resistive beds with responses of the five components of the applied RF magnetic field at 20 kHz.

FIG. 9 shows the converse situation from that in FIG. 8, wherein a conductive bed layer is sandwiched between two resistive bed layers. The resistivities of this bed layer structure are tabulated in Table 8.

TABLE 8

| Conductive Bed | Depth top boundary (ft) | Rh (Ω-m) | Rv (Ω-m) |
| --- | --- | --- | --- |
| 1 | −10 | 10 | 10 |
| 2 | 0 | 1 | 1 |
| 3 | 10 | 10 | 10 |

The $H_{xz}$ signal has a positive deflection (901) for the boundary at which the resistivity decreases with depth and a negative deflection (903) where the resistivity increases with depth.

Figure 10:
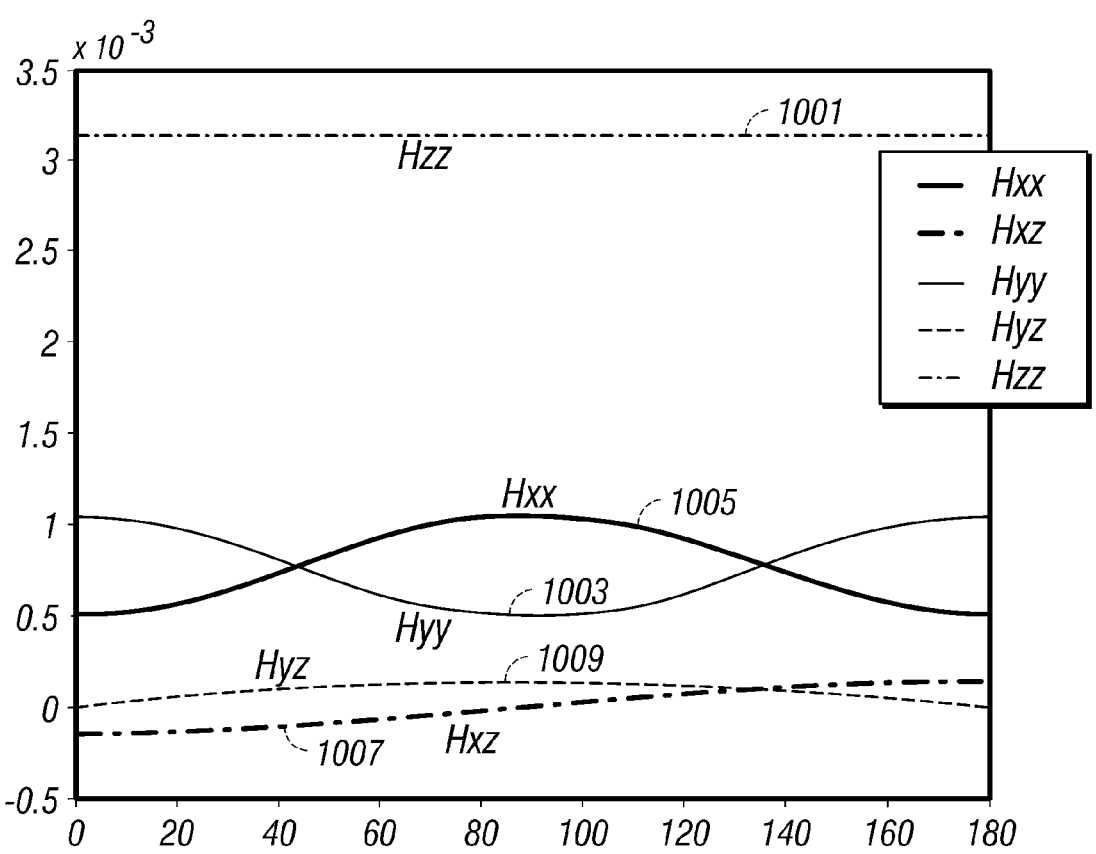
FIG. 10 shows the five component responses to the applied 200-kHz RF magnetic field as the invention is rotated through 180 degrees inside a horizontal borehole within the second bed of FIG. 4.
Figure 11:
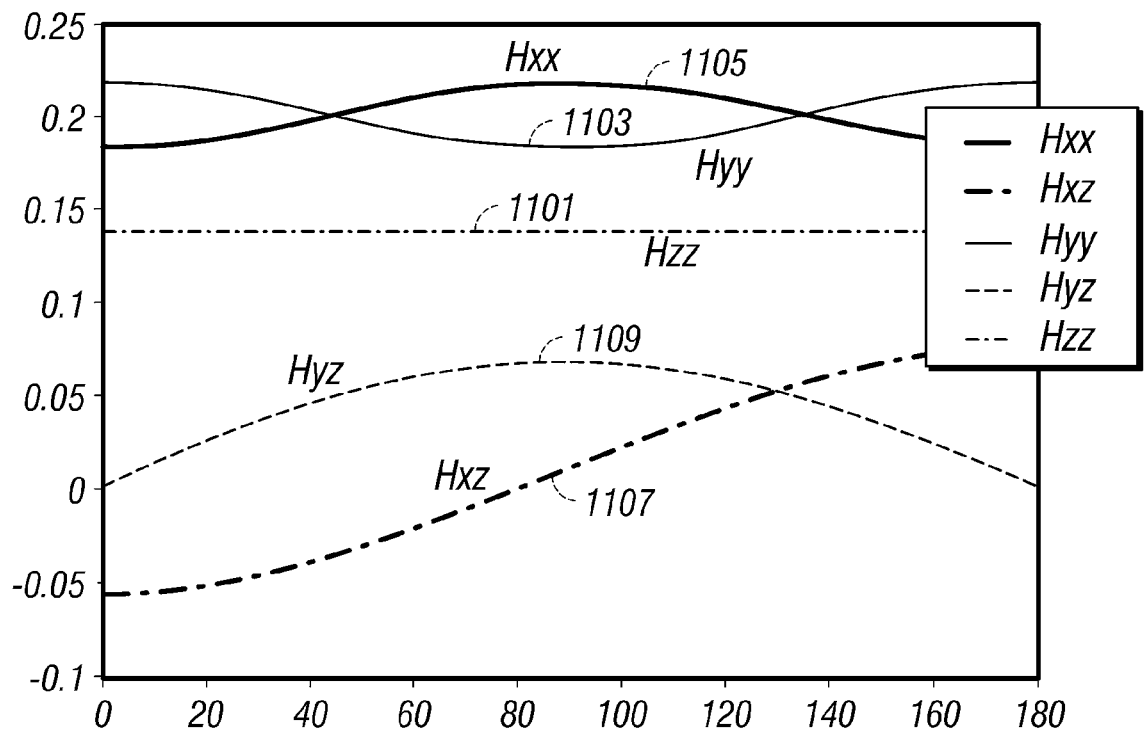
FIG. 11 shows the five component responses to the applied 20-kHz RF magnetic field as the invention is rotated through 180 degrees inside a horizontal borehole within the second bed of FIG. 4.

FIGS. 10 and 11 show graphs of response curves of a horizontal borehole centered at the midpoint (depth of 5 feet) of the second bed layer of FIG. 4. In the horizontal position, the layer above has different resistivities than the layer below, having consequences for the magnetic responses. The depth of the tool is fixed, and the tool is rotated about its longitudinal axis over a 180° variation of the toolface angle. In FIG. 10, the tool is operated at 200 kHz. Since the tool is horizontal, the $H_{zz}$ (1001) component is constant with rotation. The $H_{yy}$ (1003) and $H_{xx}$ (1005) components show a variation with toolface angle and interchange their values around a mean value as the tool rotates. It can be shown that the average of $H_{xx}$ and $H_{yy}$ is a constant independent of rotation. However, tool dip, location and the formation type do affect the values of the responses. The angular period of sinusoidal variation with respect to the relative azimuthal angular orientation of $H_{xx}$ and $H_{yy}$ is half a rotation (180°) Likewise $H_{xz}$ (1007) and $H_{yz}$ (1009) also oscillate but have a period of once per full rotation (360°).

The graph in FIG. 11 results from of the same physical configuration as in FIG. 10, except that the tool is operating at 20 kHz. The behavior of all the components is similar to those in Case 10. The $H_{yy}$ (1103) and $H_{xx}$ (1105) show a periodicity of 180°. Likewise $H_{xz}$ (1107) and $H_{yz}$ (1109) also are periodic over a full rotation (360°). At 20 kHz, the magnitude of the signal response is less than the response at 200 kHz. Also, in FIG. 11, the magnitudes of the $H_{xx}$ (1105) and $H_{yy}$ (1103) components are greater than the magnitude of the $H_{zz}$ (1101) component.

Figure 12:
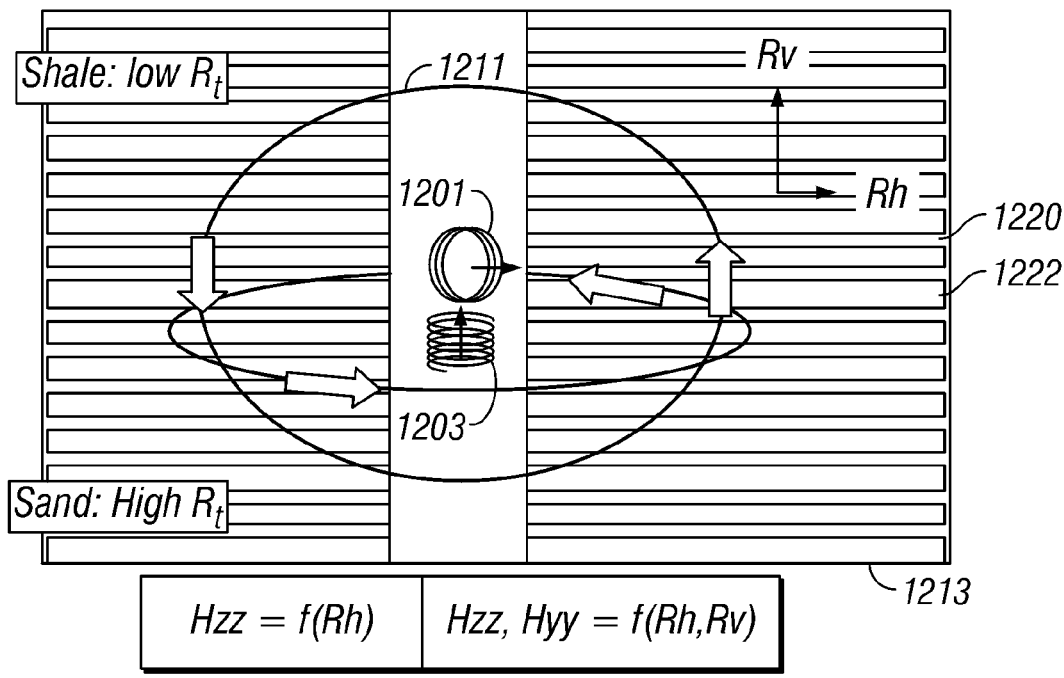
FIG. 12 shows a multi-component 3DEX induction configuration of the invention for vertical wells.

FIG. 12 gives a sketch of a 3DEX multi-component induction configuration in a vertical well. The formation comprises a series of horizontal layers alternating between sand (1220) with high total resistivity (high $R_t$) and shale (1222) with low total resistivity (low $R_t$). The well bore contains two transmitter coils for illustrative purposes. The upper coil (1201), creates a response (1211) that extends in a plane containing a vertical line. This response would be labeled $H_{xx}$ or $H_{yy}$ and would be a function of $R_h$ and of $R_v$. The lower (1203) coil creates a response (1213) that lies entirely within a horizontal plane. This response for $H_{zz}$ would be a function of $R_h$ only.

Figure 13A:
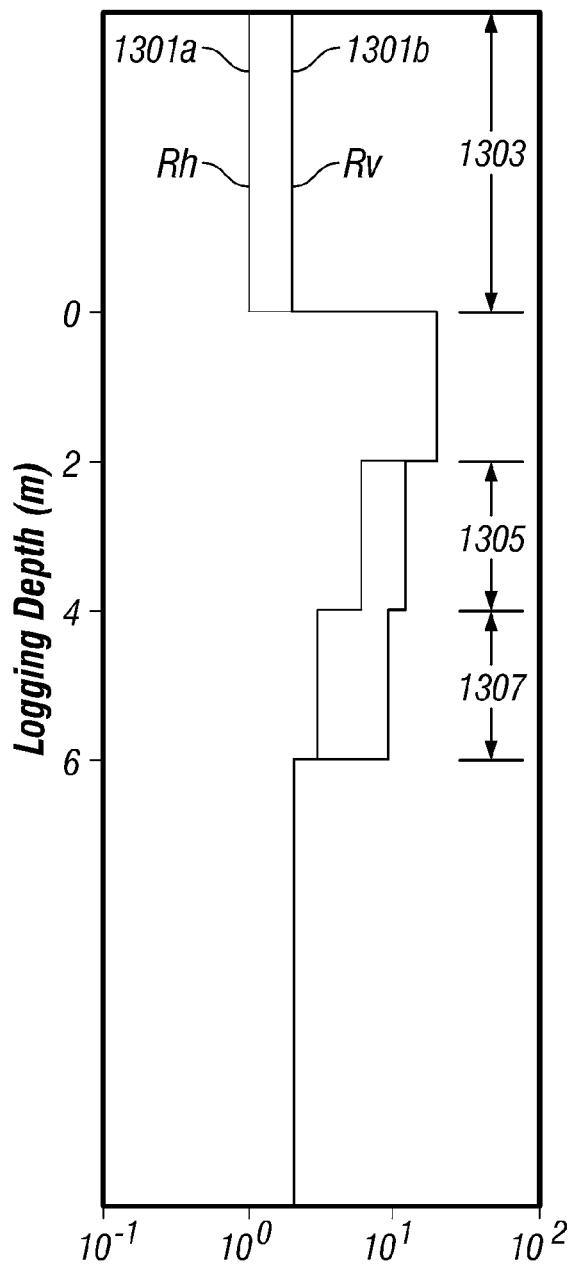
FIG. 13A shows a plot of a model of formation resistivity against logging depth, with three anisotropic resistivity intervals.
Figure 13B:
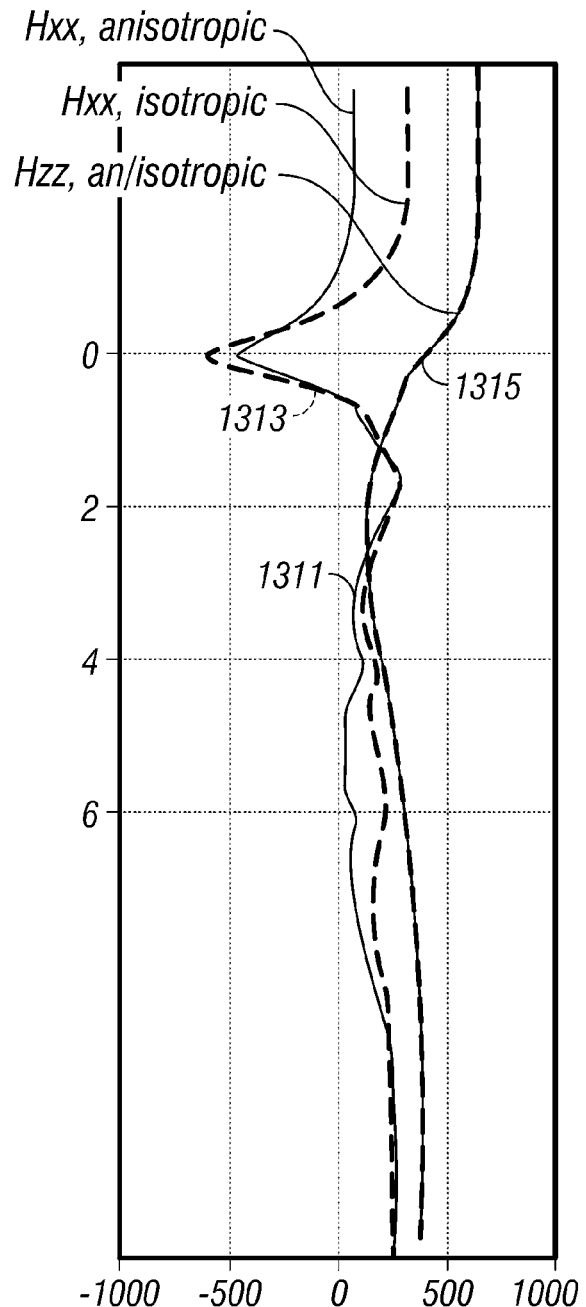
FIG. 13B shows a model of the responses of $H_{xx}$ and $H_{zz}$ in both isotropic and anisotropic materials of FIG. 13A.

Shown in FIG. 13A is a resistivity model of a medium with horizontal and vertical resistivities denoted by 1301a and 1301b. The model has three anisotropic intervals indicated as 1303, 1305, and 1307 where the vertical resistivity $R_v$ is greater than the horizontal resistivity $R_h$. FIG. 13B shows the apparent conductivity responses for the $H_{xx}$ (1311) component in the anisotropic model of FIG. 13A. Also shown is the $H_{xx}$ component (1313) for the case of a resistivity model that is isotropic at all depths. The $H_{zz}$ (1315) component of the response for an isotropic model is the same as for the anisotropic model. From FIG. 13B, the following observations may be made about the resistivity responses for a vertical well in an anisotropic formation: The $H_{zz}$ response (1315) is not responsive to anisotropy in the formation, while the $H_{xx}$ curves (1311, 1313) are responsive. The $H_{xx}$ response is suppressed by anisotropy. The $H_{xx}$ responses are quite complicated and can even reverse sign close to significant resistivity contrasts. The $H_{xx}$ response may have spikes at bed boundaries.

Figure 14:
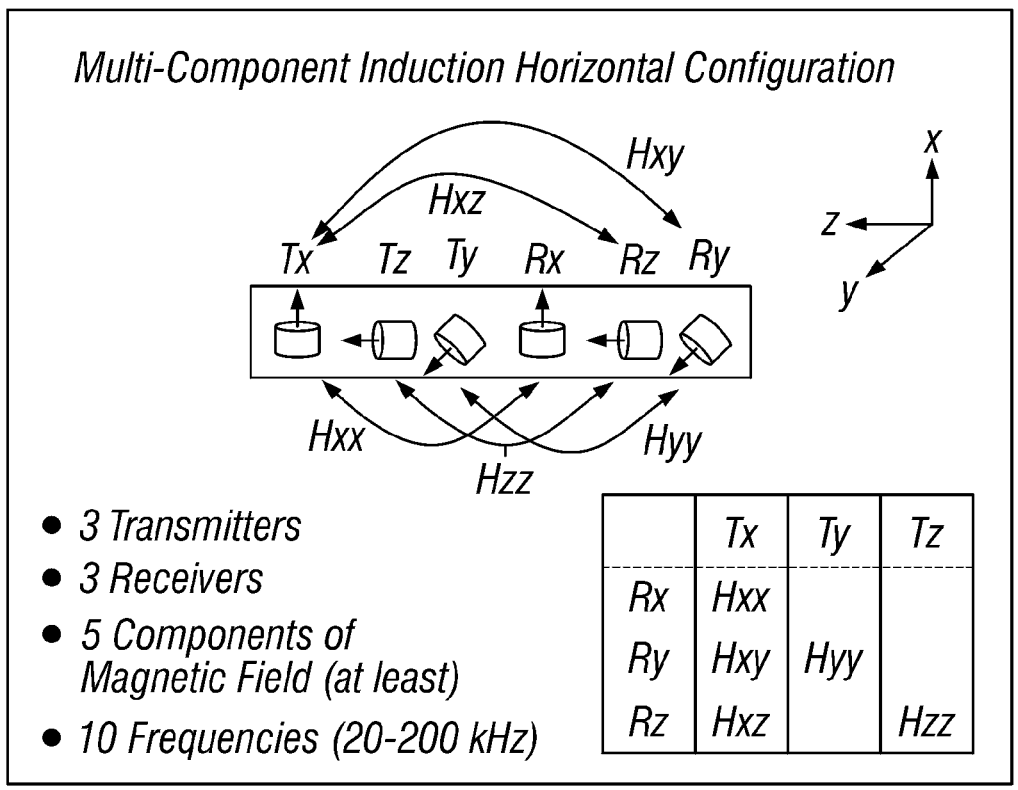
FIG. 14 shows a multi-component induction configuration of the invention for horizontal wells.

FIG. 14 shows a sketch of a horizontal configuration for a multi-component induction tool. The orientation of the transmitters and receivers remain fixed with respect to the tool. The multi-component tool in horizontal configuration is sensitive to the anisotropic formation, tool location as well as the rotation of the tool around its axis. Only the $H_{zz}$ component is insensitive to tool rotation. In horizontal configuration, the average $0.5*(H_{xx}+H_{yy})$ is independent of tool rotation. The $H_{yy}$ and $0.5*(H_{xx}+H_{yy})$ measurements are dependent on the formation and the tool location and thus an be used to determine the distance from the bed boundaries and for geo-steering the invention.

The method of the present invention may be used with data acquired with a logging instrument conveyed on a wireline and also with data acquired using a measurements while drilling (MWD) apparatus conveyed on a drilling tubular such as a drill string or coiled tubing. In particular, when used with MWD measurements, this directional information may be used for controlling the direction of drilling and maintaining the position of the borehole relative to beds in the proximity of the borehole.

Referring now to FIG. 15, a borehole 1426 (i.e., a directional well) is drilled which is initially vertical and is thereafter directed generally horizontally into a pay zone (i.e., hydrocarbon producing bed 1417). The direction of penetration is indicated by 1428 and the rotation of the drillstring 1414 is indicated by 1430. Also shown in FIG. 15 are nonporous formations 1416, 1418. For simplifying the illustration, the antenna coils are not shown. The selection of the pay zone may be based from a previously drilled well (not shown) or other geologic information. As taught in Wu, based on the previously drilled well, detailed information is obtained regarding the resistivity of the earth formations, particularly in proximity to the pay zone. A modeled tool response is obtained, the difference being that in the present invention, the model includes vertical and horizontal resistivities of earth formations, and the modeled response includes several components of the measurements; in contrast, the model in Wu includes only a single resistivity for each layer and the modeled response is that for a multiple propagation resistivity (MPR) tool. Based on a comparison between the modeled tool response and actual measurements made downhole, the drilling operator can adjust and/or correct the directional drilling operations to maintain the drilling in a desired stratum. FIG. 15 is a special case where the angle θ between the borehole and the normal to the layers equals 90°. Examples of such modeling have been shown above in FIGS. 3-11 and 13.

Figure 16:
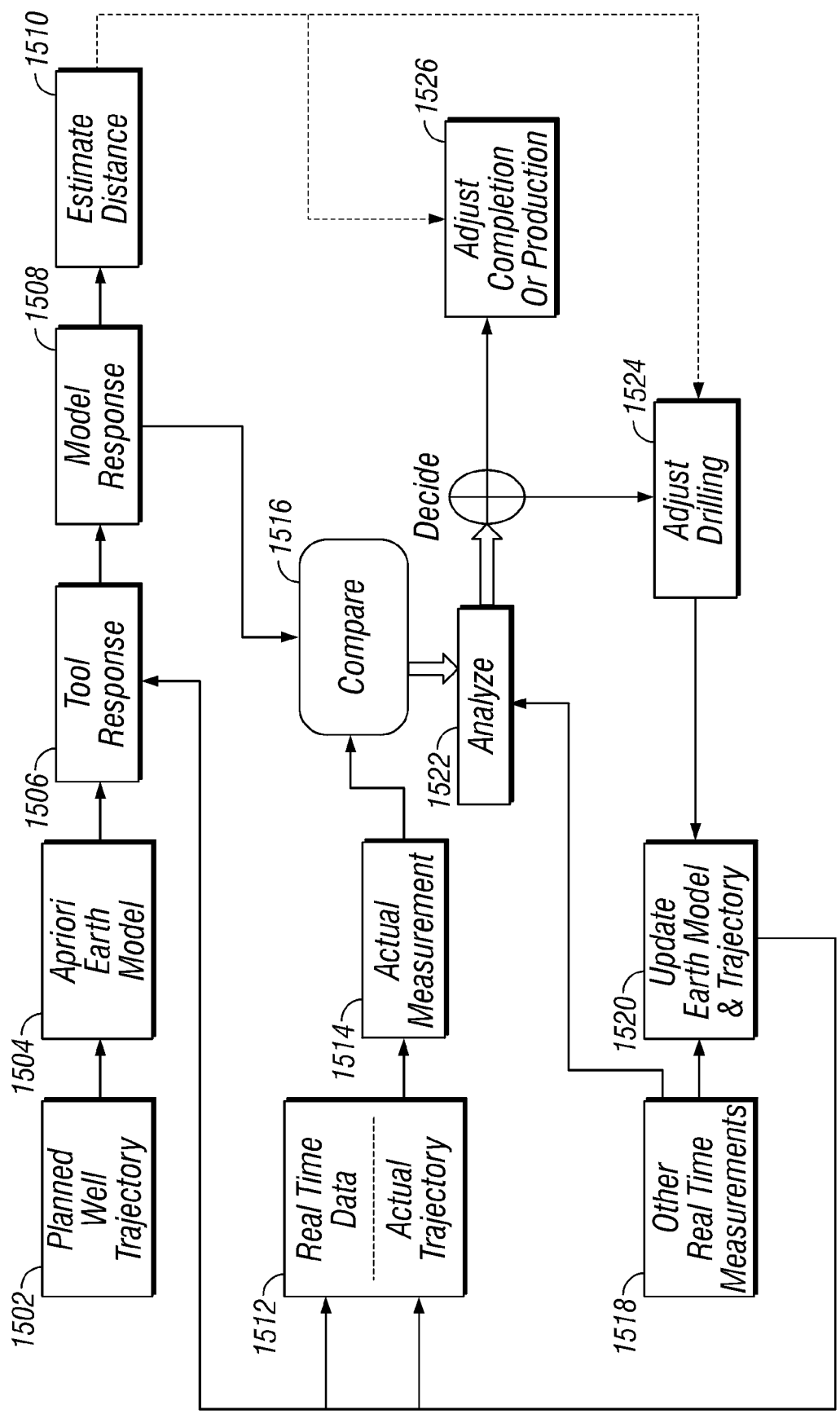
FIG. 16 is a flow chart illustrating some of the embodiments of the present invention.

An exemplary flow chart of how the method of the present invention is given in FIG. 16. A planned well trajectory 1502 is stored in the memory of a processor (not shown), either at the surface or downhole. Based on the previous measurements of resistivity, an a priori earth model is obtained 1504 along the planned trajectory, and using a known tool response 1506, the model output 1508 is determined. In addition, real-time data are obtained 1512 regarding the actual trajectory of the drilling assembly. These real-time data may be obtained using a suitable navigation device, preferably that disclosed in U.S. Pat. No. 6,347,282 to Estes, having the same assignee as the present application and the contents of which are fully incorporated herein by reference. Actual measurements made with the 3DEX resistivity tool 1514 are compared 1516 with the model output, and based on further analysis 1522 of the data, the drilling direction is adjusted 1524. The analysis takes into account the actual and desired positions of the drilling assembly within the pay zone. Several methods are discussed below. Based on the changes in the drilling direction, the earth model and trajectory are updated 1520. This updating may include other real-time measurements 1518, such as those from other logging tools, that may be indicative of actual conditions in the subsurface that may be different from the a priori earth model used in 1504.

In reservoir navigation, a particular parameter of interest is distance from a selected interface. An example of this would be a situation where the distance from a fluid interface such as a gas/oil or oil/water interface has to be maintained at a specified value. In an optional embodiment of the invention, this distance is calculated 1510 and the drilling is adjusted accordingly. The interface may also be a bed boundary.

As noted above, there are certain measurements that are invariant with respect to tool rotation. These include $H_{zz}$, $H_{xx}+H_{yy}$, and the quantity $\sqrt{H_{xz}^2+H_{yz}^2}$. An alternate approach is to perform inversion to match the measured data with the earth model response to determine the position of the tool.

The response of $\sqrt{H_{xz}^2+H_{yz}^2}$ has maximum value at the boundary and decreases away from it. Thus, if this value increases the tool is approaching a boundary and can be used as a quick indicator of distance from the next bed. When the orientation of the tool is such that the X-transmitter is pointing in increasing depth direction, the $H_{xz}$ component responds to the bed boundary. However, in this situation the $H_{yz}$ component is zero. If the tool is rotated so the X-transmitter is oriented at an angle φ then the measured components can be rotated back to increasing depth direction by the expression $H'_{xz}=H_{xz}\cos(\phi)-H_{yx}\sin(\phi)$ The modeling indicates that when the tool is crossing from higher resistivity to lower resistivity region the polarity of $H_{xz}$ is opposite of the case when tool is crossing from lower to higher resistivity. Thus, with the knowledge of formation acquired earlier, it is possible to determine if the tool is approaching the boundary above or below the bed of interest by the polarity and change in the magnitude of $H_{xz}$.

Using the measured magnetic components, we can compute an objective function which is sensitive to the parameter of interest e.g. an approaching bed boundary during horizontal drilling. An example of the objective function is:

$$g\left\{ \frac{\left(\sum_l \sum_k \left(\sum_{p=x,y,z}\sum_{q=x,y,z} \alpha_{kpq} H_{pq}^{r1k}(\omega_l)\right)^{s1k}\right)}{\left(\sum_l \sum_k \left(\sum_{p=x,y,z}\sum_{q=x,y,z} \beta_{kpq} H_{pq}^{r2k}(\omega_l)\right)^{s2k}\right)} \right\} \quad (1)$$

Here l, k are integer indices. The parameter α, β, r and s are constants. The indices p and q represent the component direction (i.e. x, y, z). It should be clear the functional relation in which the magnetic field are used is not limited to above rational form. There are many other functions, which can be constructed depending on what physical parameter is being investigated. These functions may use the magnetic fields in their complex forms or their real and/or quadrature components. Further, these can be expanded in a Taylor or Maclaurin series to calculate the parameter of interest explicitly or implicitly. It should be noted that measurements made with propagation resistivity tools can also be treated using this formulation. An example of g(•) is the scaled natural logarithm function "−20 log(x)" commonly used to calculate attenuation in decibels and phase in radians. It should be clear the function chosen here is merely an illustrative example and is not limited to it. In case induction or the propagation type tool many other functions are possible depending upon their sensitivity to the parameters of interest.

A specific example of the objective function is:

$$f(d) = \frac{\sqrt{(H_{xz}^2 + H_{yz}^2)}}{\sqrt{(H_{xx} + H_{yy} + H_{zz})^2 + (H_{xz}^2 + H_{yz}^2)}} \quad (2)$$

Figure 17:
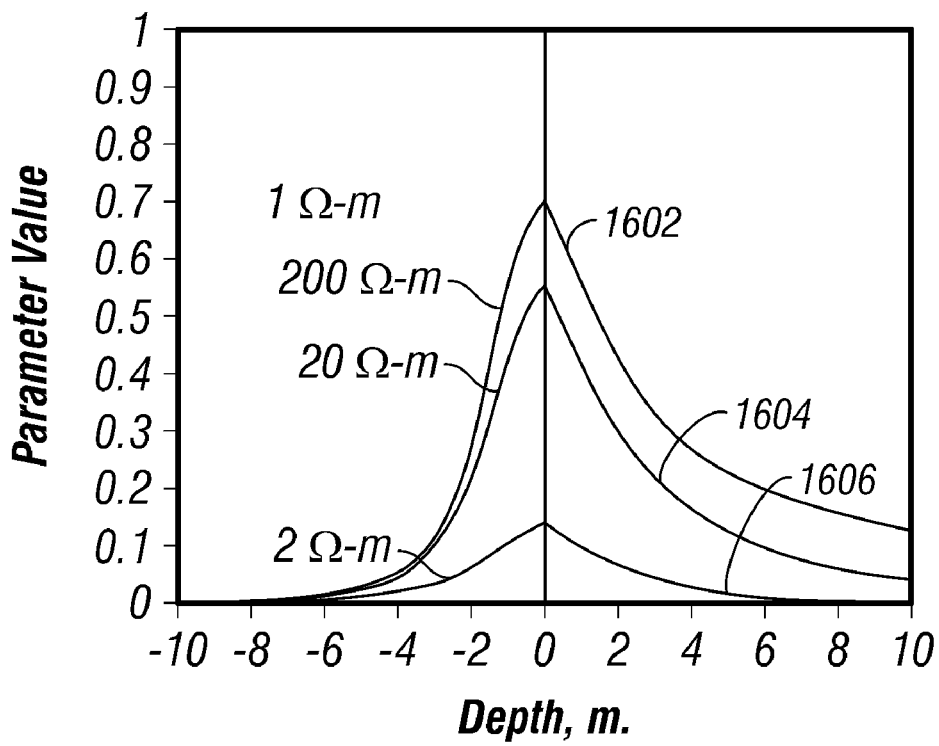
FIG. 17 shows a plot of a distance indicator for a model example at a frequency of 20 kHz.

In the above expression the quadrature component of each of the magnetic field is used. The advantage of above function is that it is independent of the angle or rotation of the tool and uses various measurements to normalize the value to lie between 0 and 1. It is a strong function of the distance d of the bed-boundary when the tool is within a certain distance, and hence may be called a distance indicator. As an example for the situation where there is one bed boundary between two half spaces of 1 Ω-m and 2 (or 20 or 200) Ω-m the above function is close to zero when the tool is in a horizontal or near-horizontal well and is more than 4 meters away. As the tool approaches the bed boundary from above or below the function increases in value till it reaches it maximum value at the boundary. The maximum value depends on the contrast. FIG. 17 shows a plot of the above objective function computed for tool operating at 20 kHz. abscissa is the distance to the bed boundary and the ordinate is the distance indicator. The curve 1602 is for a resistivity of 200 Ω-m, the curve 1604 is for a resistivity of 20 Ω-m, while 1606 is for a resistivity of 2 Ω-m.

Figure 18:
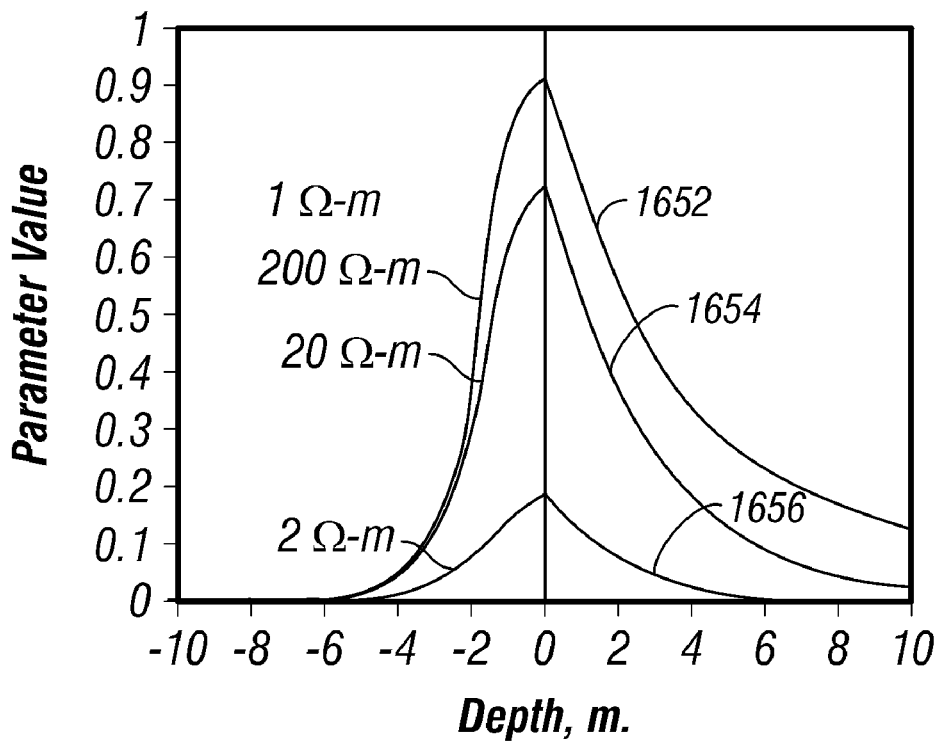
FIG. 18 shows a plot of a distance indicator for a model example at a frequency of 55 kHz.

Shown in FIG. 18 are similar plots of a distance indicator at a frequency of 55 kHz. with the curves 1652, 1654 and 1656 corresponding to resistivity values of 200 Ω-m, 20 Ω-m and 2 Ω-m respectively. It is worth noting that when the bed is highly resistive (200Ω-m), the distance indicator is sensitive to the bed boundary even at a distance of 10 m, making the measurement suitable for reservoir navigation when the objective is to maintain a fixed distance from the oil-water contact, or a gas-water contact.

A sudden change in otherwise smooth profile may indicate that the assumption of layered structure and material properties may have been violated. There may be previously unknown faults or formation slippage.

The above expressions assume the ability to measure several of the quantities $H_{xx}$, $H_{xy}$, $H_{xz}$, $H_{yx}$, $H_{yy}$, $H_{yz}$, $H_{zx}$, $H_{zy}$, $H_{zz}$ explicitly. However, this is not always essential, especially in the case when the tool is rotating. In MWD tools, the same sensors can make some of the measurements during rotation as long as measurements are made of the toolface angle. For example, $H_{yz}$ can be obtained from the sensor which measures $H_{xz}$ when it has rotated through 90°. Likewise, $H_{yy}$ can be obtained from the sensor measuring $H_{xx}$ after rotation of 90°.

Thus, in MWD environment, it is possible to compute the same functions of the magnetic fields as long as at least three measurements $H_{zz}$, $H_{xx}$ and $H_{xz}$ at different angle of rotation of the tool are available. As an example the above boundary distance indicator can be rewritten as $$f(d) = \frac{\sqrt{2\overline{H}_{xz}^2}}{\sqrt{(2\overline{H}_{xx} + H_{zz}) + 2\overline{H}_{xz}^2}} \quad \text{where} \quad (3)$$

$$\overline{H}_{xz} = \sqrt{1/K \sum_{k=1}^{K} H_{xz}^2(\phi_x)} \quad \text{and} \quad (4a)$$

$$\overline{H}_{xx} = 1/L \sum_{l=1}^{L} H_{xz}^2(\phi_l) \quad (4b)$$

Thus, the analysis may be based upon a an average of the measurements made during rotation of the bottom hole assembly. Specifically, Eq. 4a defines an $L^2$ norm of the corresponding measurements.

Figure 19A:
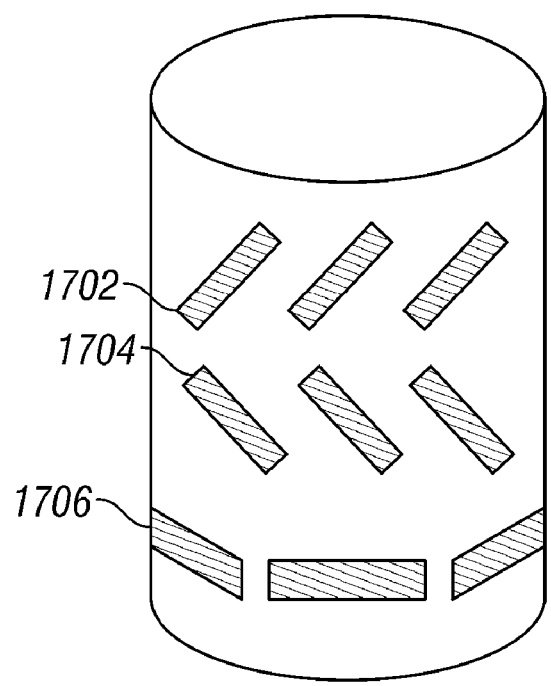
FIGS. 19A, 19B show the use of a slotted antenna cover or inclined coils with the method of the present invention.
Figure 19B:
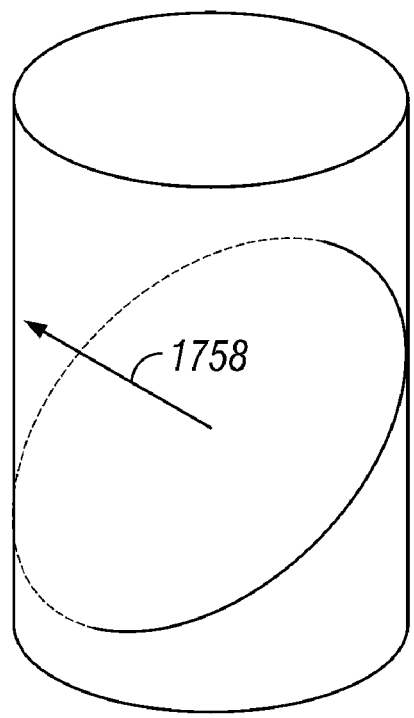

In the discussion above, the quantities $H_{xx}$, $H_{xy}$, $H_{xz}$, $H_{yx}$, $H_{yy}$, $H_{yz}$, $H_{zx}$, $H_{zy}$, $H_{zz}$ have been assumed to have been made by using the principal orthogonal coil arrangement with one aligned along the axis to the tool and other two perpendicular to the axis and to each other. However it is not essential that this be so. The actual measurements may be done by tilted coils or non-orthogonal coils. Alternatively, they may be obtained from slotted antennas, distributed along the body of the tool and are tilted at appropriate angles to allow the measurements of specific components. In these cases, where measurements are obtained by antennas oriented in directions other than the principal axis directions, sufficient number of components need to be measured so that they can be rotated back to the principal directions, or to any other coordinate system suitable for data interpretation An example of tilted slots 1702, 1704, 1706 is shown in FIG. 19A, An example of a tilted coil is shown in FIG. 19b. It should also be noted that instead of a slotted antenna cover, measurements may also be made through a substantially nonconductive antenna.

Returning now to FIG. 16, in an optional embodiment of the invention, the measurements are made using a wireline device. Hence, there is no altering of a drilling direction. However, completion of the wellbore is done 1526 based on the comparison and analysis, or on the basis of the estimated distance.

In addition to multicomponent measurements, the method of the present invention may also be used with multicomponent, multi-array measurements made with a plurality of transmitter-receiver distances. A methodology for interpretation of conventional multi-array measurements is disclosed in U.S. Pat. No. 6,308,136 to Tabarovsky et al, having the same assignee as the present invention and the contents of which are fully incorporated herein by reference.

The method of the present invention may also be used with measurements from other types of resistivity tools, such as a propagation resistivity device.

Included in the present invention are certain operations that have been used in prior art with respect to conventional logging tools. One of these is the operation of calibration wherein a measured current or voltage is related to a conductivity (or resistivity) using a relation of the form $$H_{xx\sigma} = aH_{xxraw} + b$$

Another step that is necessary in the present invention is that of temperature correction; this is more important for a LWD application than for a wireline device wherein the temperature has had time to reach an equilibrium.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of drilling a borehole in an earth formation, the method comprising:
   (a) conveying a logging tool on a bottom hole assembly (BHA) into said borehole in a selected layer in said formation, said borehole having an axial direction substantially parallel to a boundary of said selected layer, said BHA including a device for drilling of the borehole;
   (b) using said logging tool to obtain a plurality of multi-component resistivity measurements indicative of resistivities of said earth formation in a vicinity of said borehole, the multi-component measurements including at least one measurement made with a receiver having an axis inclined to an axis of a transmitter;
   (c) comparing said plurality of multi-component resistivity measurements with expected values of said measurements obtained from a model; and
   (d) controlling a direction of drilling of said drilling device on said BHA in response to said comparison.

2. The method of claim 1 said model includes predetermined resistivity values of said resistivities of said earth formation.

3. The method of claim 2 wherein said predetermined resistivity values are obtained from one of (i) a previously drilled borehole, and, (ii) geologic information.

4. The method of claim 1 wherein said multi-component measurements further comprise at least one of (i) multifrequency measurements, and, (ii) array measurements made with a plurality of transmitter-receiver distances.

5. The method of claim 1 further comprising
   (i) obtaining one of said multicomponent measurements using a selected transmitter-receiver combination,
   (ii) rotating said logging tool, and
   (iii) obtaining another of said plurality of multicomponent measurements using said selected transmitter receiver combination.

6. The method of claim 1 wherein controlling said direction of drilling further comprises maintaining said BHA at a desired distance from an interface in the earth formation.

7. The method of claim 6 wherein said interface is selected from the group consisting of (i) a bed boundary, (ii) an oil-water interface, (iii) an oil-gas interface, and, (iv) a gas-water interface.

8. The method of claim 1 wherein said logging tool has a plurality of coils that are parallel to or orthogonal to an axis of the logging tool and wherein said plurality of multicomponent measurements are selected from the group consisting of (i) a $H_{xx}$ measurement, (ii) a $H_{xy}$ measurement, (iii) a $H_{xz}$ measurement, (iv) a $H_{yx}$ measurement, (v) a $H_{yy}$ measurement, (vi) a $H_{yz}$ measurement, (vii) a $H_{zx}$ measurement, (viii) a $H_{zy}$ measurement, and, (ix) a $H_{zz}$ measurement.

9. The method of claim 1 wherein said plurality of coils that are inclined at an angle other than 0° or 90° to an axis of the logging tool.

10. The method of claim 9 wherein said multicomponent measurements are selected so as to be able to define a plurality of measurements selected from the group consisting of (i) a $H_{xx}$ measurement, (ii) a $H_{xy}$ measurement, (iii) a $H_{xz}$ measurement, (iv) a $H_{yx}$ measurement, (v) a $H_{yy}$ measurement, (vi) a $H_{yz}$ measurement, (vii) a $H_{zx}$ measurement, (viii) a $H_{zy}$ measurement, and, (x) a $H_{zz}$ measurement.

* * * * *

UNITED STATES PATENT AND TRADEMARK OFFICE
CERTIFICATE OF CORRECTION

PATENT NO.         : 7,612,566 B2                                    Page 1 of 1
APPLICATION NO. : 11/758390
DATED              : November 3, 2009
INVENTOR(S)        : Gulamabbas A. Merchant et al.

It is certified that error appears in the above-identified patent and that said Letters Patent is hereby corrected as shown below:

Column 15, claim 2, line 28, delete "claim 1 said", insert --claim 1, wherein said--;

Column 16, claim 5, line 8, delete "transmitter receiver", insert --transmitter-receiver--; and Column 16, claim 9, line 25, delete "said plurality", insert --said logging tool has a plurality--.

Signed and Sealed this

Eighth Day of December, 2009

David J. Kappos
*Director of the United States Patent and Trademark Office*